(12) United States Patent
Chen et al.

(10) Patent No.: US 6,701,308 B1
(45) Date of Patent: Mar. 2, 2004

(54) METHOD AND APPARATUS FOR FIXED FORMAT WORD PROCESSING

(75) Inventors: Hui Yeen Chen, Taipei (TW); Ling Hua Wu, Chang-Hua County (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/352,123

(22) Filed: Jul. 13, 1999

(30) Foreign Application Priority Data

Jul. 17, 1998 (JP) .......................................... 10-203090

(51) Int. Cl.⁷ ............................................. G06F 17/30
(52) U.S. Cl. ........................... 707/3; 707/100; 707/102; 715/517
(58) Field of Search ............................. 707/3, 100–102; 715/517

(56) References Cited

U.S. PATENT DOCUMENTS

| | | | | |
|---|---|---|---|---|
| 5,761,655 A | * | 6/1998 | Hoffman | 707/4 |
| 5,870,746 A | * | 2/1999 | Knutson et al. | 707/101 |
| 5,907,704 A | * | 5/1999 | Gudmundson et al. | 717/100 |
| 6,243,711 B1 | * | 6/2001 | Wu et al. | 707/104.1 |

FOREIGN PATENT DOCUMENTS

| | | |
|---|---|---|
| JP | 6303370 | 10/1994 |
| JP | 8171555 | 7/1996 |
| JP | 9-91284 | 4/1997 |
| JP | 10-11280 | 1/1998 |

OTHER PUBLICATIONS

An English Language abstract of JP 10–11280.
An English Language abstract of JP 9–91284.
An English Language abstract of JP 8–171555.
An English Language abstract of JP 6–303370.

* cited by examiner

Primary Examiner—Safet Metjahic
Assistant Examiner—Cam Linh T Nguyen
(74) Attorney, Agent, or Firm—Greenblum & Bernstein, P.L.C.

(57) ABSTRACT

The concept of database management is employed in the field of word processing, thereby strengthening the format design characteristics so as to simplify word processing with repeating formats and repeating data and so as to aid in ensuring uniformity of documents of similar types.

4 Claims, 11 Drawing Sheets

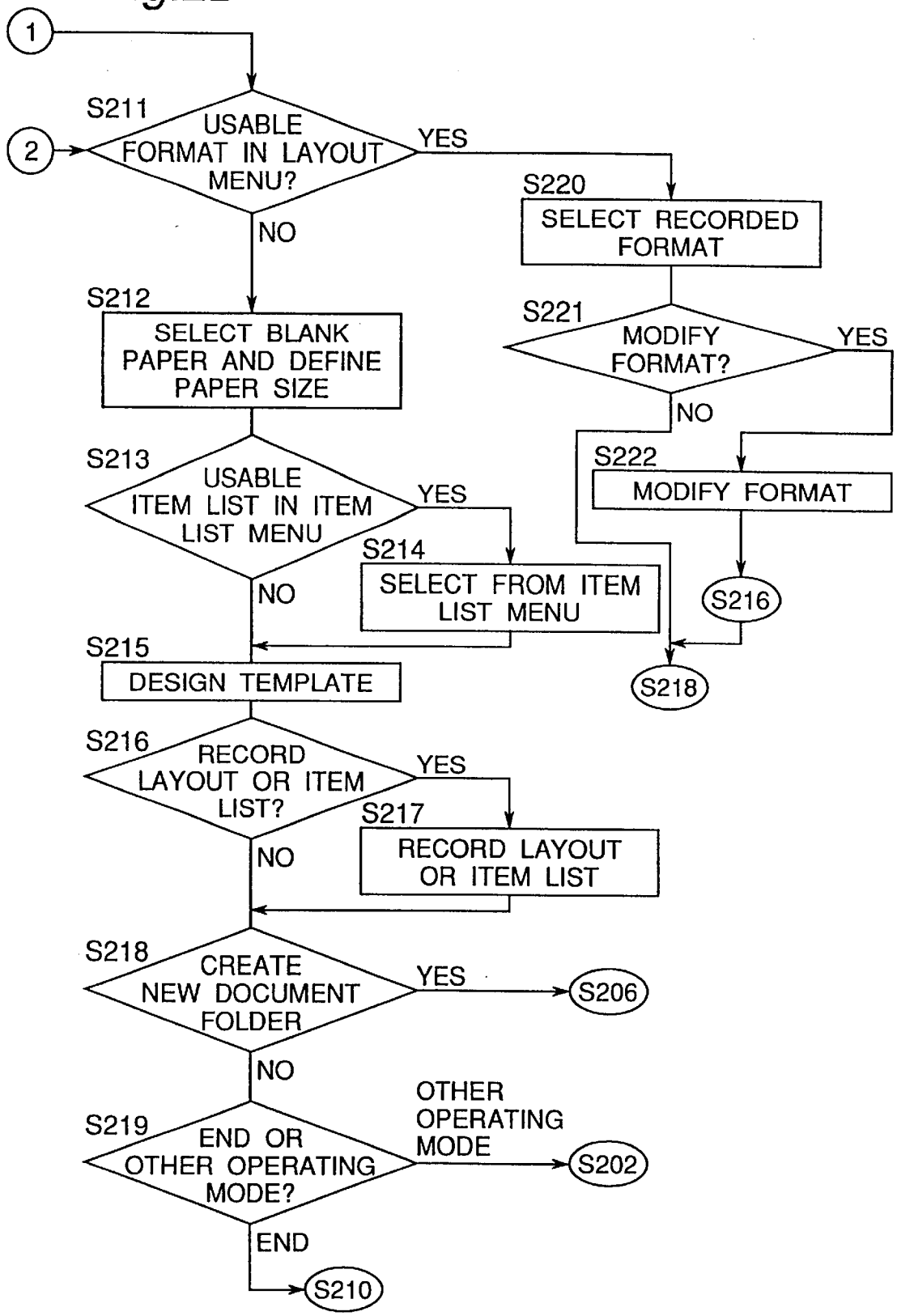

METHOD AND APPARATUS FOR FIXED FORMAT WORD PROCESSING

BACKGROUND OF THE INVENTION

1. Field of the Invention

The invention relates to a method and an apparatus for word processing and, more particularly, to a method and an apparatus for fixed format word processing in which the concept of database management is employed in the field of word processing, and which can provide the user with a managing tool with which documents of the same type can be stored together to facilitate searching and managing while obviating the need to redesign documents having the same format.

2. Description of the Prior Art

The concept of using file folders to manage documents of the same type has been around even before the advent of the computer age. When it is desired to fill up a document having a specified format, one goes to a file cabinet to retrieve the required blank form. After filling up the same, the document is placed in a file folder which contains documents of the same type. The currently available word processing apparatus such as, for example, the WORD (Reg. Trademark owned by Microsoft Corp., hereinafter the same) computer program released by MICROSOFT is more or less inclined to unrestrained editing of a single document, and lack reuse and managing functions for documents of the same type. However, work involving fixed format documents, such as facsimile transmissions, minutes of meetings, decisions, letters, reports, memorandums, etc., are in frequent use in our daily lives. The "template" function of "WORD Ver. 7.0" provides the user with a number of basic formats of documents that are frequently encountered. A template generally comprises a pre-defined fixed document format. For example, when creating an official document, the form, borders and headings thereof are needed in each official document. Only the contents of the official document have to be inputted each time an official document is created. Thus, by using the template function of "WORD ver. 7.0" to create a new document, the time for creating the document format can be saved, thereby aiding the user in creating the document quickly. Although the "WORD" already provides the "template" function to help the user create documents of the same type, which fully comply with the page specifications, there is no managing function which enables the user to store documents of the same format together in order to facilitate searching and management. In addition, it is inconvenient for the user to create his or her own template.

FIG. 8 is a system block diagram of a word processing apparatus formed from a computer that is loaded with "WORD Ver. 7.0". When the user edits a document via "WORD Ver. 7.0", information received externally by the input portion 81 is provided to the document and template editing means 83, which determines if the processing method requires document editing or template editing. However, since the operating domain of the two are entirely the same, the document and template editing means 83 will provide word processing, graphics tools, changes in parameter settings, etc., to the user for creating documents or templates. Documents 88 are stored via the document access means 85. On the other hand, templates 89 are stored via the template classification managing means 86, which classifies templates according to their nature, and the template access means 87. By means of the input portion 81, the full text indexing means 84 goes through the document access means 85 or the template access means 87 to provide the user with document or template indexing functions.

FIG. 9 is a flowchart which illustrates the operation performed by the user when the WORD-based word processing apparatus is used to edit a document. As shown, the user is given two options when it is desired to edit a document via "WORD Ver. 7.0". When it is desired to modify an existing file, the "open file" option is selected in step S917, and in step S918 it is specified whether the file to be opened is a document or template. Editing or modifying is executed in step S919. When it is desired to create a new file, the "create new file" option is selected in step S910, and in step S911 it is specified whether the file to be created is a document or template. In step S912, there is a further option of selecting a template or using a blank form. Editing of the document or template is executed in step S913. After steps S919 or S913, storing in a single document or single template form is executed in step S914, and in step S915 the user is given the option of selecting and specifying a piece of paper for printing before the operation is terminated in step S916.

From the system block diagram and the operation flowchart, it can be understood that processing of documents or templates do not occur in separate routines in the prior art. In addition, there is no managing means for managing documents created from the same template. As such, it would be impossible to search for the data of all related documents.

The drawbacks associated with the use of "WORD Ver. 7.0" in processing and storing data are as follows:

1. Creation of templates and editing of documents cannot be easily grasped by the user as they do not occur in separate routines. First, one must be able to distinguish clearly the differences between templates and documents. If a facsimile format was retrieved from the file cabinet, this facsimile format is a template. The contents of the documents are the data inputted to fill up the blanks of each facsimile format. When "WORD Ver. 7.0" is used to perform data processing, the input of document contents and the creation of formats are mixed up and are not done in separate routines.
2. Unrestrained editing of a single document is stressed. Documents having the same format are independent files and thus, have no bridging relationship. Management is not easy since documents which are created using the same template are stored separately.
3. As pointed out in item 2, there is no collective managing of documents, thereby resulting in inconvenience when searching. For example, when it is desired to search for all facsimiles sent to the "Patent Office" from among all facsimile transmissions, one has to look at each facsimile file during the search. This is both laborious and time consuming.
4. The contents of the documents are not classified into different categories. Searching relies on full text indexing, which is not only time consuming and inaccurate but also makes it impossible to search by process conditions. For example, if it is desired to find a facsimile dated January 25, "WORD" will search all of the contents of the different facsimiles to find information relevant to January 25. However, this does not necessarily mean that the facsimile that was found actually has a date of January 25. In addition, it is not possible to perform a search for all facsimiles dated before January 25.
5. Since data is stored in text format, it is not possible to distinguish the same data written in different formats.

For example, Jan. 25, 1997, 86th year of the Republic of China 1st Month 25th Day, and Jan. 25, 1997 all refer to the same date. However, "WORD" is unable to recognize the same when it is used to process data (such as when conducting a search).

6. Data already inputted cannot be reused. For example, it is not uncommon for one to send facsimiles to a particular company or business establishment. In this regard, the recipient, address, telephone and facsimile numbers are all related to the name of the company. In "WORD", even though a facsimile has been previously sent, the above information has to be inputted again if another facsimile is to be sent.

SUMMARY OF THE INVENTION

Therefore, the object of the present invention is to provide a method and an apparatus for fixed format word processing which provide the user with a managing tool that is capable of storing documents of the same type together to facilitate searching and managing and that obviates the need to redesign documents having the same format.

According to one aspect of the present invention, a fixed format word processing method for a computer system with a data buffer region, an input portion and an output portion, comprises the steps of:

partitioning the data buffer region into a document base for storing different types of document folders, each of which has document data of the same format, into a layout base for storing document formats, and into an item list menu for storing document items;

providing a command input to select execution of template creation or search processing;

if template creation was selected for execution, performing at least one of a number of sub-steps including:
  selecting one of a number of layouts which already include a plurality of the document items from the layout base for conducting modifications;
  selecting a pre-defined one of a number of item lists from the item list menu for redesigning of one of the layouts; and
  defining new document items and designing a new layout which includes the document items, the new document items and the new layout being stored separately in the item list menu and the layout base;

if search processing was selected for execution, specifying a search condition through the input portion; determining if the search condition is to be used to search the document base entirely or a specified one of the document folders; if only the specified one of the document folders is to be searched, retrieving selectively the specified one of the document folders from the document base to the data buffer region for comparison; if the document base is to be searched entirely, comparing the search condition with contents of the document base and retrieving selectively all documents in the document base which meet the search condition; and combining corresponding ones of the document data, layout and item list in one of the document folders of the document base to form a specified complete one of the documents, and outputting the complete one of the documents via the output portion.

According to another aspect of the present invention, a fixed format word processing method for a computer system with a data buffer region, an input portion and an output portion, comprises the steps of:

partitioning the data buffer region into a document base for storing different types of document folders, each of which has document data of the same format, into a bridging relationship database for storing bridging relationship item data of documents, a layout base for storing document formats, and into an item list menu for storing document items;

providing a first command input to select execution of document editing management, template creation or search processing;

if document editing management was selected for execution, providing a second command input to perform at least one of document editing and document management for a specified one of the document folders in the document base to obtain processed data, the document editing including at least one of data copying, cutting, pasting, saving and item data inputting, the document management including at least one of modifying, deleting, saving and printing of the documents; resolving the processed data according to the different item types; and storing resolved processed data in the document base;

establishing management of the bridging relationship data items in the item list menu so as to permit searching in the bridging relationship database of the bridging relationship data corresponding to an input main key value during editing of one of the documents in order to generate the bridging relationship data in the document, and so as to record mutual bridging relationship data in the bridging relationship database;

if template creation was selected for execution, performing at least one of a number of sub-steps including:
  selecting one of a number of layouts which already include a plurality of the document items from the layout base for conducting modifications;
  selecting a pre-defined one of a number of item lists from the item list menu for redesigning of one of the layouts; and
  defining new document items and designing a new layout which includes the document items, the new document items and the new layout being stored separately in the item list menu and the layout base;

if search processing was selected for execution: specifying a search condition through the input portion; determining if the search condition is to be used to search the document base entirely or a specified one of the document folders; if only the specified one of the document folders is to be searched, retrieving selectively the specified one of the document folders from the document base to the data buffer region for comparison; if the document base is to be searched entirely, comparing the search condition with contents of the document base and retrieving selectively all documents in the document base which meet the search condition; and combining corresponding ones of the document data, layout and item list in one of the document folders of the document base to form a specified complete one of the documents, and outputting the complete one of the documents via the output portion.

According to still another aspect of the present invention, a fixed format word processing apparatus includes a data buffer region, an input portion and an output portion. This fixed format word processing comprises:

the data buffer region being partitioned into a document base for storing data of different document folders, a layout base for storing layouts, and an item list menu for storing item lists;

control means, connected to the input and output portions, for selecting between template creation and search processing based on a command input received thereby from the input portion;

template editing management means, connected to the control means and the data buffer region, for performing at least one of selecting from among the item lists that include a plurality of document items and the layouts which already exist from the item list menu and the layout base for conducting modifications, and defining new document items and designing a new layout which includes the document items, the new document items and the new layout being stored separately in the item list menu and the layout base; and data searching means, connected to the control means and the data buffer region, for receiving from the control means a search condition that was specified via the input portion, for comparing the search condition with at least a specified one of the document folders selected from the document base, and for retrieving all documents in the at least a specified one of the document folders selected from the document base which meet the search condition.

The control means includes means for combining corresponding ones of the document data, layout and item list in one of the document folders of the document base to form a specified complete one of the documents, and for outputting the complete one of the documents via the output portion.

According to a further aspect of the present invention, the fixed format word processing apparatus may comprise:

the data buffer region being partitioned into a document base for storing data of different document folders, a bridging relationship database for storing bridging relationship item data, a layout base for storing layouts, and an item list menu for storing item lists;

control means, connected to the input and output portions, for selecting from among document editing management, template creation and search processing based on a command input received thereby from the input portion; document editing management means, connected to the control means and the data buffer region, for performing at least one of editing and managing of an existing one of the documents or a new document for a specified one of the document folders of the document base to obtain processed data, the document editing including at least one of data copying, cutting, pasting, saving and character inputting, the document managing including at least one of modifying, deleting, saving and printing of the documents, the document editing management means resolving the processed data according to the different item types of the document data and storing resolved processed data in the document base;

bridging relationship management means, connected to the document editing management means and the data buffer region, for establishing bridging relationship data item management in the item list menu so as to permit searching in the bridging relationship database of the bridging relationship data corresponding to an input item data in order to generate the bridging relationship data in the document, and so as to record mutual bridging relationship data in the bridging relationship database;

template editing management means, connected to the control means and the data buffer region, for selecting from among the item lists that include a plurality of document items and the layouts which already exist from the item list menu and the layout base for conducting modifications, and for defining new document items and designing a new layout which includes the document items, the template editing management means storing separately the new document items and the new layout in the item list menu and the layout base; and data searching means, connected to the control means and the data buffer region, for receiving from the control means a search condition that was specified via the input portion, for comparing the search condition with at least a specified one of the document folders selected from the document base, and for retrieving all of the documents in the at least a specified one of the document folders of the document base which meet the search condition, in which case the control means includes means for combining corresponding ones of the document data, layout and item list in one of the document folders of the document base to form a specified complete one of the documents, and for outputting the complete one of the documents via the output portion.

According to the fixed format word processing apparatus of the present invention, after a command is inputted via the input portion, the control means will determine whether the user intends to execute document editing management, template creation or search processing. When executing document editing management is desired to be performed, the user performs document editing, including data copying, cutting, pasting, saving and character inputting, or document management, including modifying, deleting, saving and printing of the documents, of an existing one of the documents or a new document for a specified one of the document folders of the document base with the use of the document editing management means. After processing has been completed, the processed data is resolved according to the different item types prior to storage in the document base. Aside from the different item menus of the documents, bridging relationship data items are also stored in the item list menu.

Thus, when the user is editing data, the bridging relationship data managing means will refer to or store data in the bridging relationship database according to the item data inputted by the user. When executing template creation is desired to be performed with the use of the template editing management means, the user can select a layout which already includes a plurality of the document items from the layout base for conducting modifications, or select a predefined item list from the item list menu for redesigning of one of the layouts, or define new document items and design a new layout which includes the document items, the new document items and the new layout being stored separately in the item list menu and the layout base. The data searching means determines if a search condition has been specified by the user via the input portion, compares the same with a specified document folder of the document base or with the entire document base, and retrieves all documents in the document folder or the document base which meet the specified search condition. The results of the search or data editing management are combined with the corresponding layout and item list to form a complete document that is outputted via the output portion.

BRIEF DESCRIPTION OF THE DRAWINGS

Other features and advantages of the present invention will become apparent from the following detailed description of the preferred embodiment made with reference to the accompanying drawings, in which.

DESCRIPTION OF THE EMBODIMENTS

Figure 1:
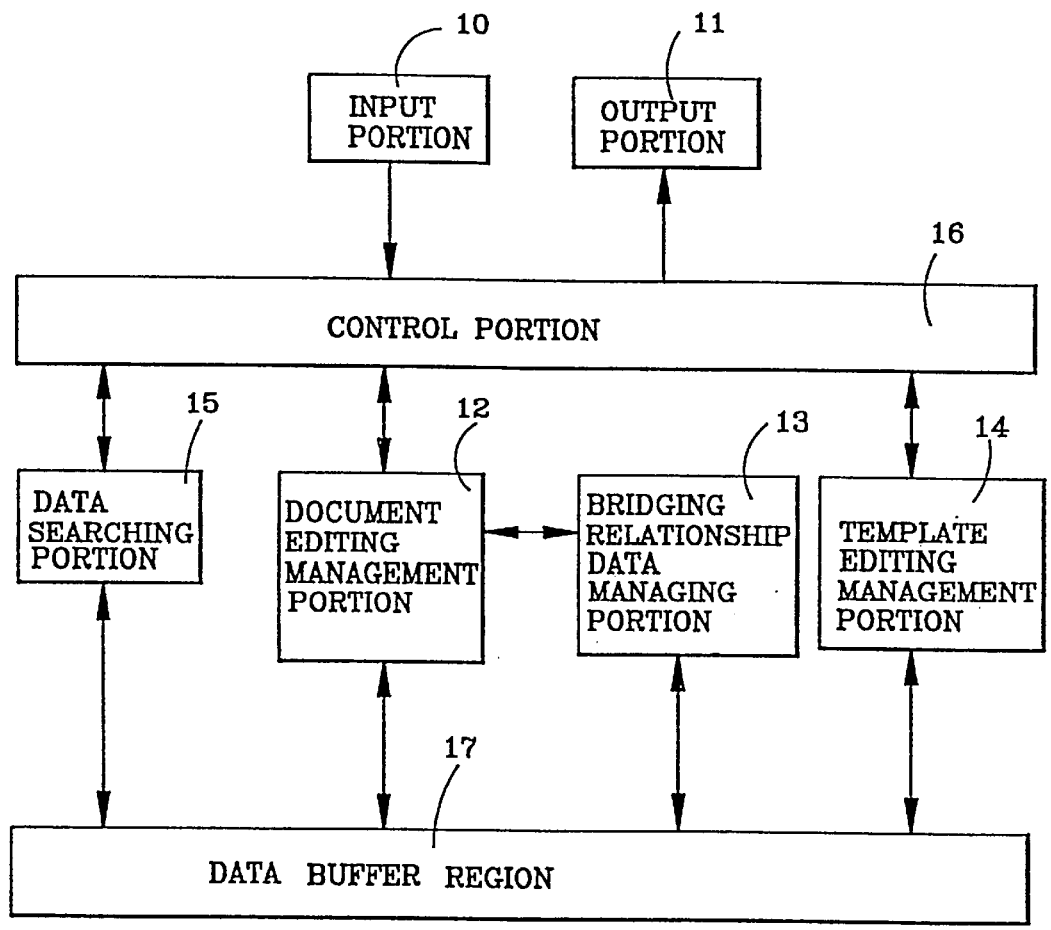
FIG. 1 is a system block diagram of the preferred embodiment of a fixed format word processing apparatus according to the present invention.

Referring first to FIG. 1 showing a system block diagram of the preferred embodiment of this invention, reference numeral 17 denotes a data buffer region for storing a document base of different document folders, a bridging relationship database for storing bridging relationship data, and an item list menu and a layout base for storing respectively different item lists and layouts recorded by the user; reference numeral 10 denotes an input portion comprised primarily of a keyboard and a computer mouse; reference numeral 11 denotes an output portion, which may be a display device or a printer; reference numeral 12 denotes a document editing management portion which is responsible for document editing and browsing or managing of the document folders; reference numeral 13 denotes a bridging relationship data managing portion which is responsible for accessing the data item values with mutual bridging relationships from the bridging relationship database of the data buffer region 17; reference numeral 14 denotes a template editing management portion which provides a layout editing device, a layout browsing device, item managing means and template managing means, and which is responsible for browsing, editing and managing item lists and layouts; reference numeral 15 denotes a data searching portion which includes data searching means for accessing the document base of the data buffer region 17 in order to find documents which meet the specified conditions; and reference numeral 16 denotes a control portion which receives a command inputted by the user via the input portion 10 to select which one of document editing, template creating or search processing is to be executed.

The data edited, browsed or searched by the user are combined by the control portion 16 with the appropriate layout for showing on the output portion 11. Initially, the control portion 16 receives the command transmitted by the user via the input portion 10 and selects the appropriate operating mode: document editing management, template editing management or data search. If document editing management is selected, the control portion 16 retrieves the document folders from the document base of the data buffer region 17 via the document folder browsing device of the document editing management portion 12, and sends the same to the output portion 11 to enable the user to perform format browsing.

Once the user has found the document folder with the specified format, the document editing management portion 12 can provide managing and editing of the documents. For documents which have completed an editing process, the document editing management portion 12, after resolving, will file the documents based on their class and store the same in the document base of the data buffer region 17 according to the different types of the items thereof. If the document folder with the specified format cannot be retrieved from the document base, processing is turned over by the control portion 16 to the template editing management portion 14.

The template editing management portion 14 selects the layout with the specified format from the layout menu in the data buffer region 17 and, through the control portion 16, calls the data editing management portion 12 to commence a document editing process. If no suitable layout can be found in the layout menu of the data buffer region 17, the template editing management portion 14 can be used to create a new layout. The template editing management portion 14 accomplishes the goal of template editing via the layout editing device and, with the aid of the item managing means, searches for an item list that can be used from the item list menu in the data buffer region 17, or defines new items for use by the layout editing device. The template editing management portion 14 will store the newly edited layout, in view of its universality and frequency of use, in the layout menu of the data buffer region 17. In addition, the item managing means can be used to perform the usual item classification management, or to record items with the same characteristics in a single item list of the item list menu of the data buffer region 17. As for items with mutual bridging relationships, these can also be recorded in the item list menu with the aid of the item managing means. A storage region is formed in the bridging relationship database of the data buffer region 17 for storage of bridging relationship item data therein. With the management of the item list menu and the layout menu of the data buffer region 17, a wider range of templates is available for reference when creating future templates.

When the document editing management portion 12 is used to process document data inputted by the user, the bridging relationship data managing portion 13 can generate item values for related data with reference to the related data stored in the bridging relationship data storage base of the data buffer region 17 in order to achieve uniformity of data and reduce the time for inputting data. If the bridging relationship data storage base does not contain the corresponding related data, the item data values of the corresponding related data can be stored by the bridging relationship data managing portion 13 in the bridging relationship data storage base of the data buffer region 17 for reference during subsequent input of the same data.

The user can access document data or document folders which meet specified conditions from the document base of the data buffer region 17 via the data searching portion 15.

Since distinguishing is possible based on different search functions, a simpler and more convenient indexing function is thus provided to the user.

The present invention provides a word processing method and an apparatus that simplify duplication of formats and data. In order to manage document data with the same format, the present invention employs the concept of database management in the field of word processing. In other words, managing of document data is accomplished via "records" and "fields" of a database. In the document folders of the aforementioned document base, each document is a record, and the different item data of each document are field data. Accordingly, the document items can be classified into different types. For example, the "transmission date" of a facsimile transmission and the "amount" in a decision can be classified as two different types of data, such as "date" and "number," respectively. Based on the settings of the data types, the apparatus of this invention can conveniently distinguish among data written in different formats and can perform a search using item conditions.

Figure 2A:
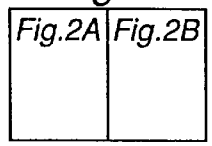
FIG. 2 (including FIGS. 2A and 2B) is an operations flowchart of the fixed format word processing apparatus of the preferred embodiment of this invention.
Figure 2A:
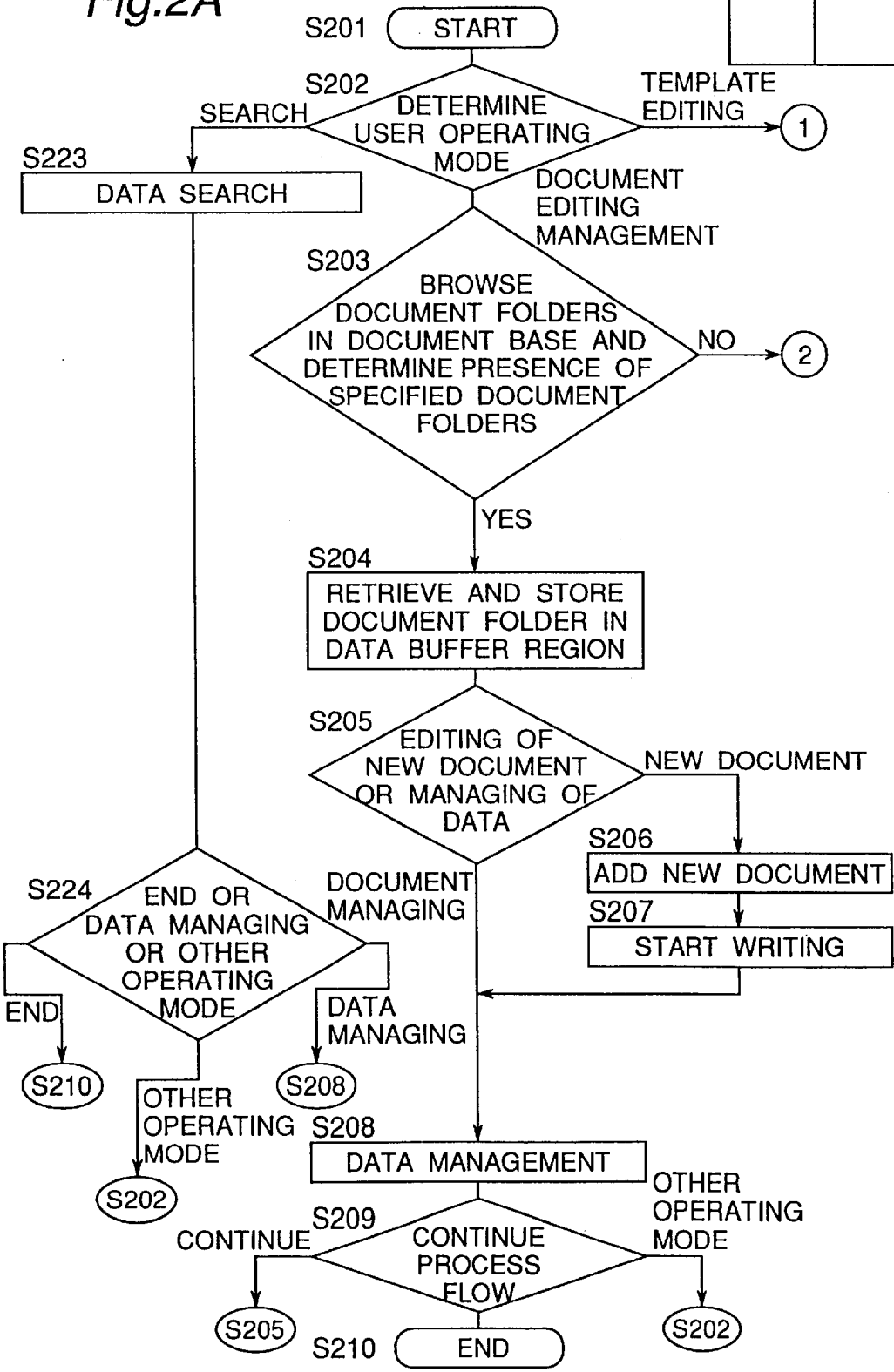

FIG. 2 is an operations flowchart which illustrates how the user employs the fixed format word processing apparatus of this invention when editing a document. Initially, after the flow starts in step S201, the user operating mode, such as document editing management, search or template editing, is determined in step S202. If the operating mode is document editing management, step S203 is performed to enable the user to browse all of the document folders currently stored in the document base in order to determine whether or not a specified document folder is present. If present, the flow proceeds to S204, where the document folder with the specified format is retrieved and stored in the data buffer region. In step S205, it is determined if editing of a new document or document managing is to be performed. If a new document is to be edited, the new document is added in step S206, and writing of the new document is started in step S207. In step S205, if document management such as saving, modifying, deleting or printing, is to be performed, the process can flow directly to step S208. In step S209, it is determined if the process flow is to be continued. If not, the process is terminated in step S210. Otherwise, the flow returns to step S205 if the document editing management process is to be continued, and to step S202 if the user operating mode is to be changed.

In step S202, if the operating mode is a search mode, the flow proceeds to step S223 to perform a data search operation. In step S224, after the search has been accomplished, the flow can proceed to step S208 for data managing, step S210 for terminating the process, or step S202 if the user operating mode is to be changed.

The template editing mode can also be selected in step S202. In step S211, the user is able to browse the layouts in the layout menu. If there is no format that can be used, step S212 is performed to give the user the option of selecting a blank paper and setting the size of the same. In step S213, the user is able to view the item lists in the item list menu. If there is a suitable item list, it can be selected in step S214. In step S215, the user is provided with means for designing a template. In step S216, the user is given the option of recording the item list or layout in the item list menu or layout menu. Recording of the layout or item list is performed in step S217. In step S218, it is determined if a new document folder is to be created. If yes, the flow automatically proceeds to step S206 for editing a new document. Otherwise, in step S219, the flow can proceed to step S210 for terminating the process, or step S202 if the user operating mode is to be changed.

In step S211, if a usable layout is available in the layout menu, step S220 is performed to select from among the different recorded formats. In step S221, it is determined if the format is to be modified. The format is modified in step S222, and the flow proceeds to step S216 to give the user the option of recording the item list or layout in the item list menu or layout menu. The flow then proceeds automatically to step S218.

Figure 3:
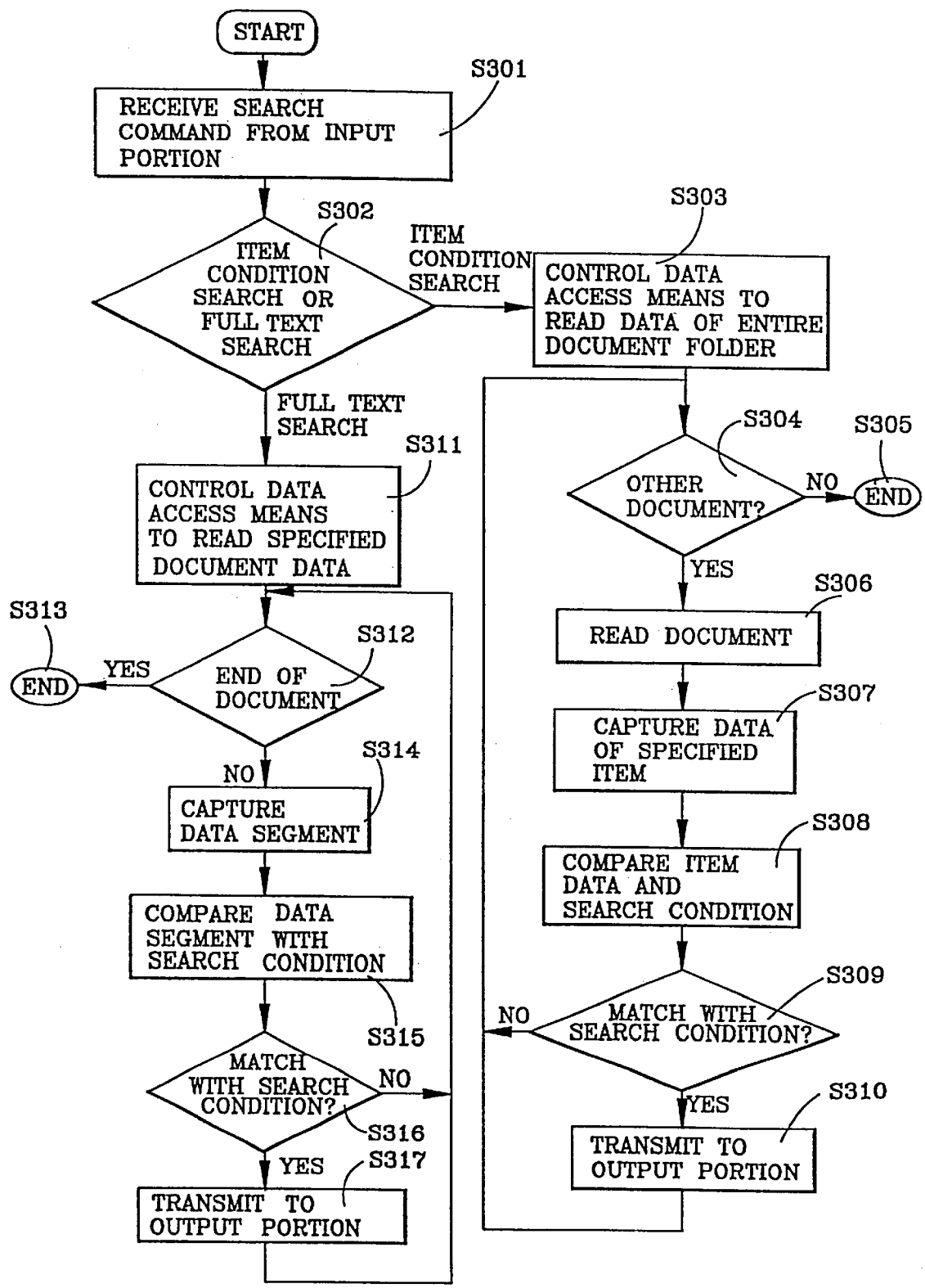
FIG. 3 is an operations flowchart of a data searching portion of the preferred embodiment of this invention.

FIG. 3 is a flowchart of the search process of the data searching portion of the fixed format word processing apparatus of this invention. This figure can serve as a supplement to the data searching step (step S223) in FIG. 2. As illustrated, the search command that is transmitted from the input portion is received in step S301. In step S302, it is determined if the search is an item condition search or a full text search. If the search is an item condition search, the flow proceeds to step S303, where the data access means is controlled so as to read the data of the entire document folder and initiate a data search of the specified items of the document folder. The data comparing method used will be explained in greater detail hereinafter with reference to FIG. 7. In step S304, it is determined if there are other documents which have yet to be searched. The search operation is terminated in step S305 if processing of the document folder has been completed. If a document has yet to be searched, the flow proceeds to step S306, where the contents of the document are read. Thereafter, in step S307, the data of the specified item is captured, and the item data and the search condition are compared in step S308. In step S309, it is determined if the item data matches the search condition. If yes, step S310 is performed for transmission to the output portion. Otherwise, the flow returns to step S304 to continue the search operation.

If the command transmitted from the input portion in step S302 is a full text search command, the flow proceeds to step S311, where the data access means is controlled so as to read the specified document data. In step S312, it is determined if the end of the document has been encountered. If yes, the search process is terminated in step S313. Otherwise, in step S314, a data segment is captured, and in step S315, the data segment is compared with the search condition. In step S316, it is determined if the data segment matches the search condition. If yes, step S317 is performed for transmission to the output portion. Otherwise, the flow returns to step S312 to continue the search operation.

Figure 4A:
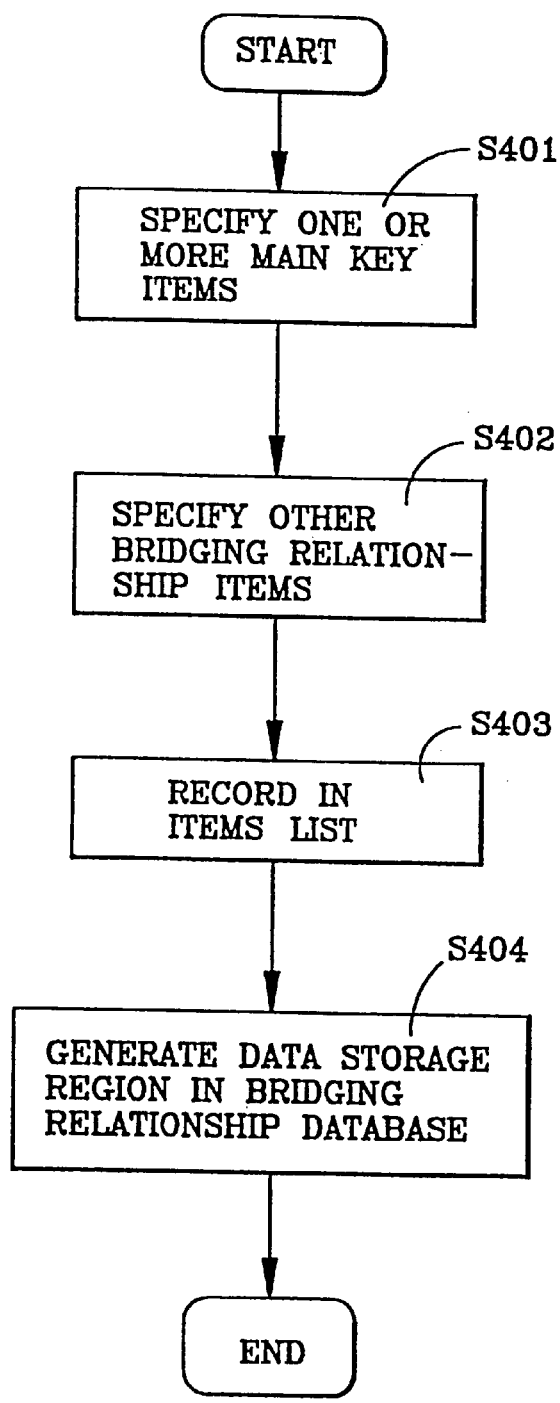
FIG. 4A is a flowchart of a bridging relationship data item recording operation of an item managing means of the preferred embodiment of this invention.

FIG. 4A is a flowchart of a bridging relationship item recording operation of an item managing means of the template editing management portion of the fixed format word processing apparatus of this invention. In the item managing means, the present invention provides a method of recording "bridging relationship data items," such as that shown in FIG. 4A. In step S401, one or more main key items are specified, and in step S402, other bridging relationship items are specified. In step S403, these are recorded in the item list to complete the recording means. In step S404, a storage region in the bridging relationship database of the data buffer region is established to provide access to the specified bridging relationship data.

Figure 4B:
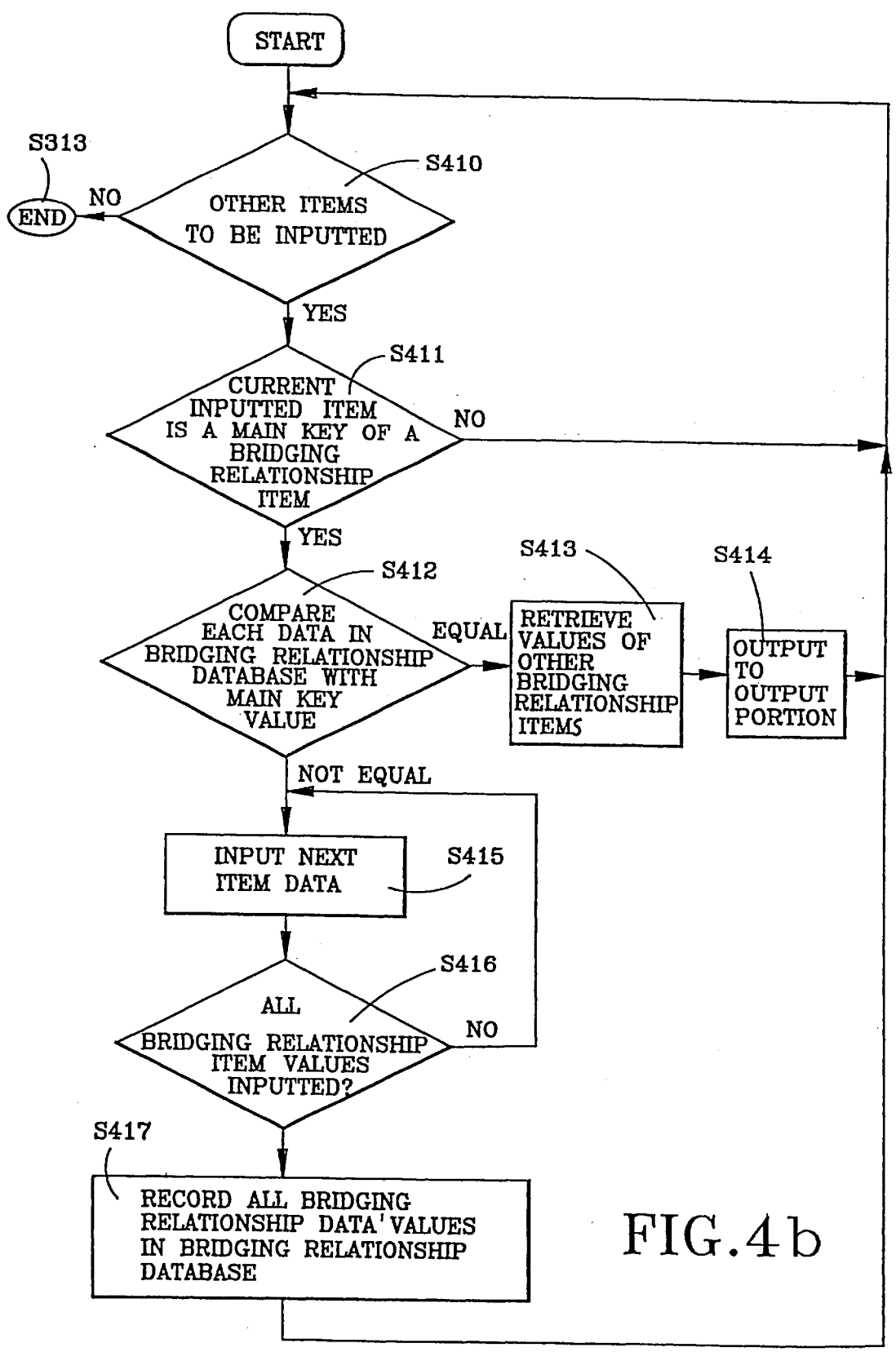
FIG. 4B is an operations flowchart of a bridging relationship data managing means of the preferred embodiment of this invention.

FIG. 4B is a process flowchart of the bridging relationship data managing portion of the fixed format word processing apparatus of this invention. During document editing, "bridging relationship data management" aids in the method of generating data. Initially, it is determined in step S410 if other items have yet to be inputted. If yes, the bridging relationship data managing portion will determine in step S411 if the current inputted item is a main key of a bridging relationship item. If not, the flow returns to step S410 to continue with the input of other items. If yes, the flow proceeds to step S412 where each data in the bridging relationship database is compared with the value of the main key. If the inputted main key value is equal to that from the bridging relationship database, the bridging relationship managing means retrieves the values of the other bridging relationship items in step S413, and outputs the same to the output portion in step S414 before the process flows back to step S410. If the inputted main key value is not equal in step S412, the process proceeds with the input of the next item data in step S415. In step S416, it is determined if all of the bridging relationship item values have been inputted. The flow returns to step S415 if an item value has yet to be inputted. Otherwise, in step S417, the bridging relationship data managing portion will record all bridging relationship data values in the bridging relationship database for use by subsequent related data. As such, the time for inputting data can be reduced, and the uniformity of data can be ensured.

Figure 5A:
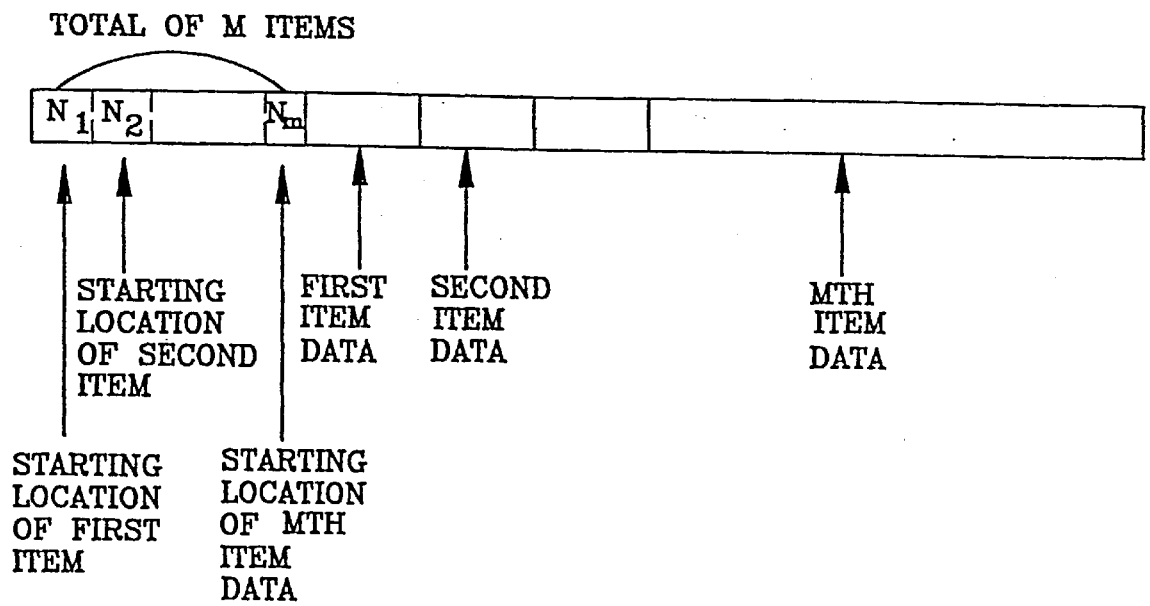
FIG. 5A is a schematic diagram which illustrates the data structure of a document stored by the document managing means of the preferred embodiment of this invention.
Figure 5B:
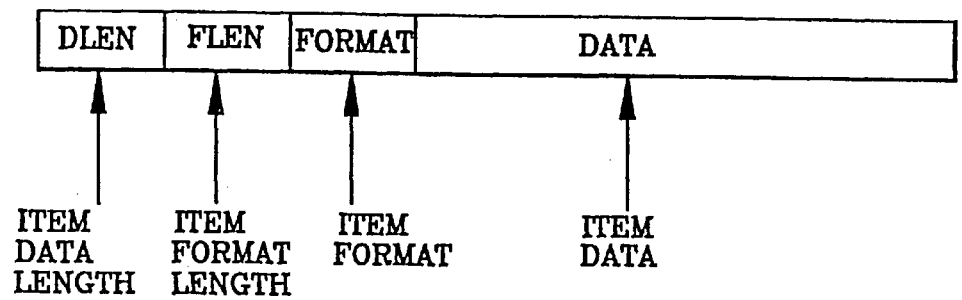
FIG. 5B is a schematic diagram which illustrates the data structure of an item data stored by the document managing means of the preferred embodiment of this invention.

FIG. 5A is a schematic diagram which illustrates how data of each document in a document folder of the document base of the data buffer region of the fixed format word processing apparatus of this invention are stored. Because all of the documents in the same document folder will include the same list of items, the method of storing data of the documents in the same document folder should be the same. As shown in FIG. 5A, the data of a document is formed from all of the item data, and comprises the starting locations N1, N2, . . . , Nm of each item data to facilitate retrieving of the data of each item. FIG. 5B is a schematic diagram which illustrates how the data of each data item is stored. The data comprises four different signals, namely DLen—which denotes the total length of the item data, FLen—which denotes the length of the item format, Format—which denotes the input format of the item data, and Data—which denotes the actual data.

The aforementioned storage methods not only facilitate accessing of the data of each item, but also facilitate identification of data written in different formats. That is to say, the storage of data does not involve direct storage of the data values inputted by the user, but undergo a separation where the starting data and the input format are separated. For example, when obtaining the data of the second item, the values N2, N3 are obtained from the second and third flags of the document. As such, it can be determined that the location of the second item data starts at N2, and the total length is N3-N2. Since the data of each item is stored in the manner shown in FIG. 5B, the aforesaid two numbers are recorded respectively as the data length and format length. The actual location of the data is N2+2*sizeof(int)+FLen. That is to say, the location of data corresponding to a kth data item is given by the following equation:

$$Nk+2*sizeof(int)+FLen \qquad \text{Equation A}$$

DLen is the length of the item data.

Figure 6:
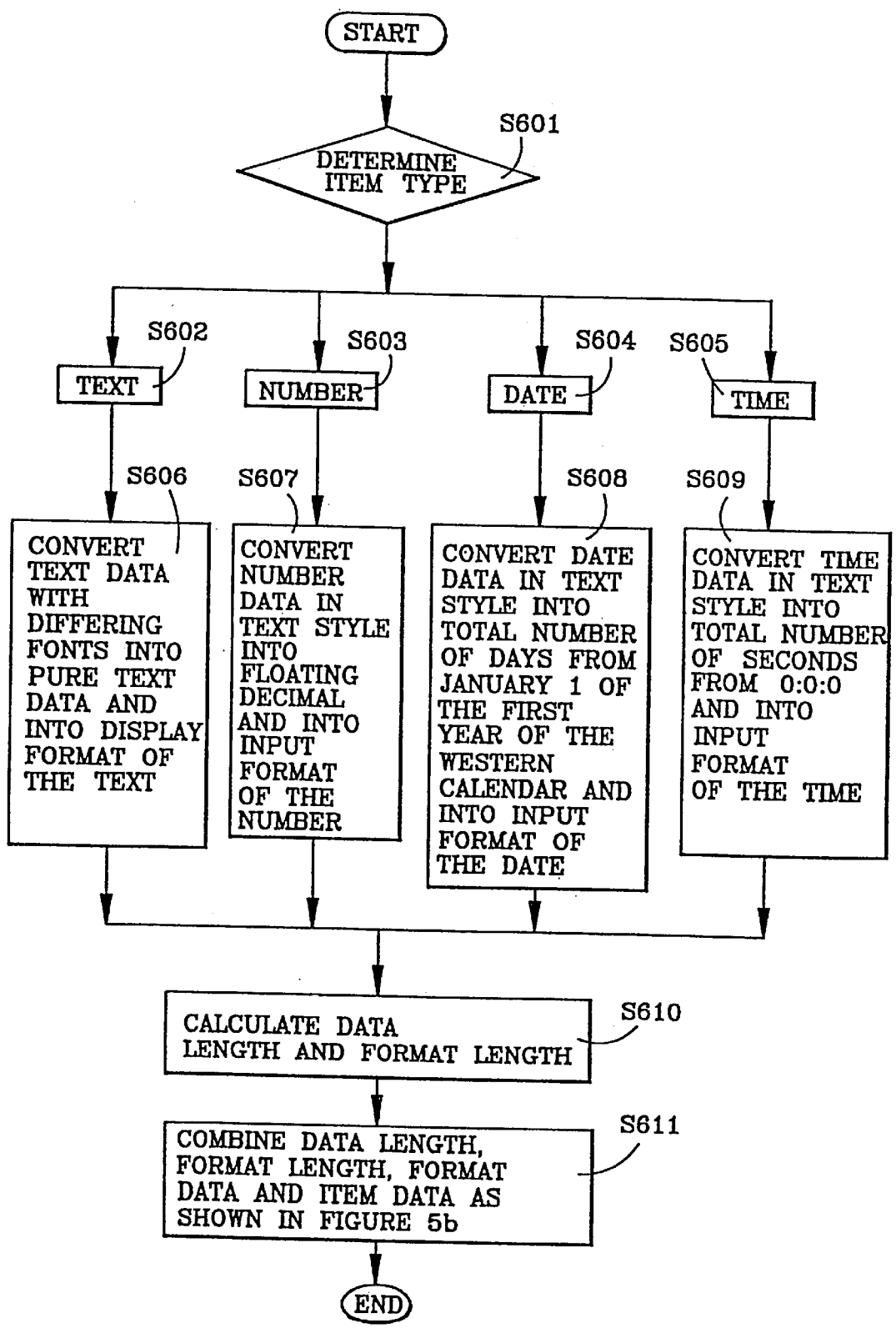
FIG. 6 is a flowchart of the data storing operation of the document managing means of the preferred embodiment of the present invention.

FIG. 6 is a flowchart of the data storing operation for different item types of the data of each document in a document folder of the document base of the data buffer region of the fixed format word processing apparatus according to the present invention. When it is desired to store data, the type of the item is determined in step S601. In step S602, if the item is in text type, the flow proceeds to step S606, where text data with differing fonts is converted into pure text data and into the display format of the text. In step S603, if the item is in number type, the flow proceeds to step S607, where number data in text style is converted into a floating decimal and into the input format of the number. In step S604, if the item is in date type, the flow proceeds to step S608, where date data in text style is converted into the total number of days starting from January 1 of the first year of the western calendar and into the input format of the date. In step S605, if the item is in time type, the flow proceeds to step S609, where time data in text style is converted into the total number of seconds from 0:0:0 and into the input format of the time. After steps S606, S607, S608 or S609, the data length and format length are calculated in step S610, and in step S611, the item data is completed in the storing manner shown in FIG. 5B.

Figure 7:
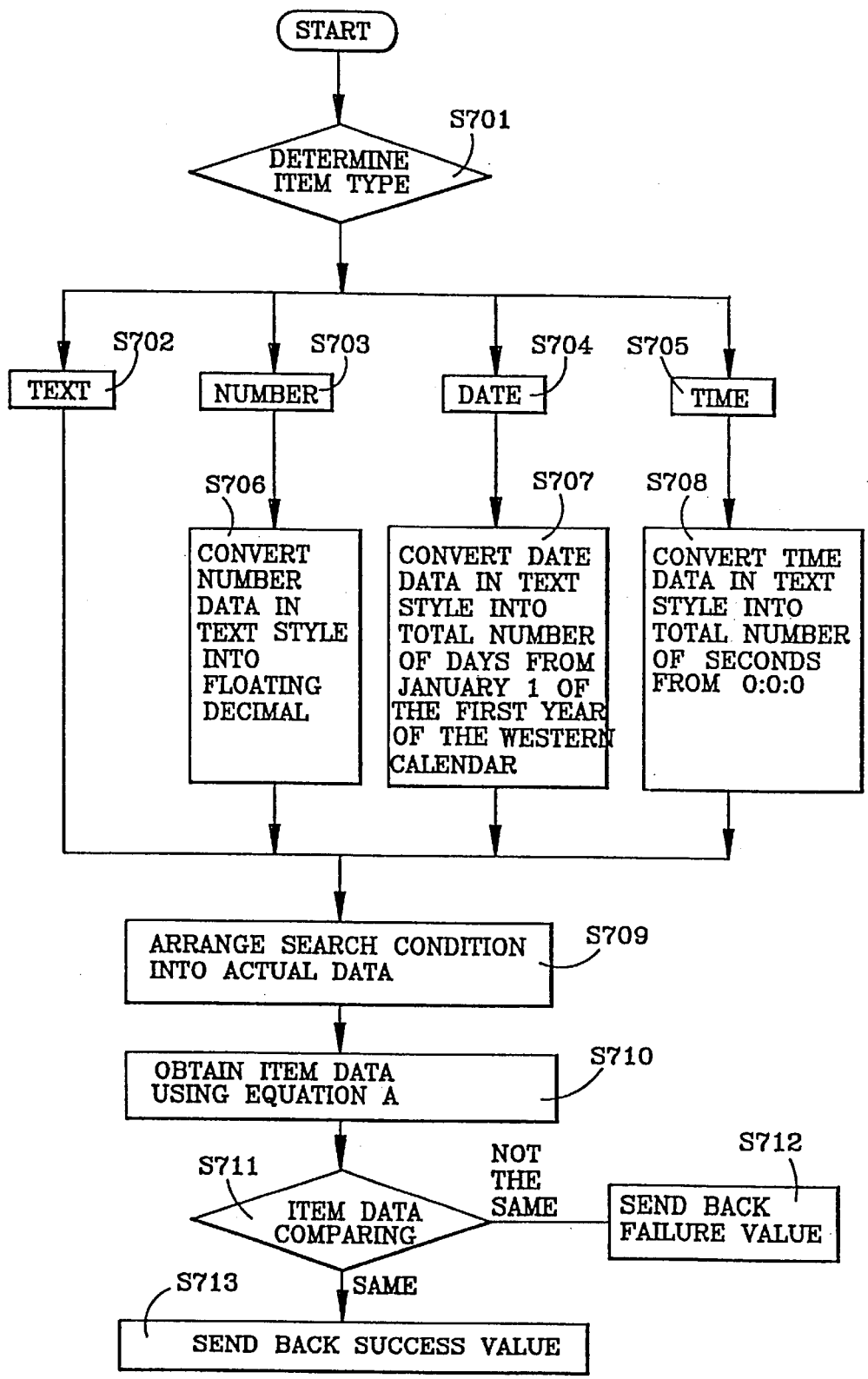
FIG. 7 is an operations flowchart of the data searching portion and data access means of the preferred embodiment of the present invention.
Figure 8:
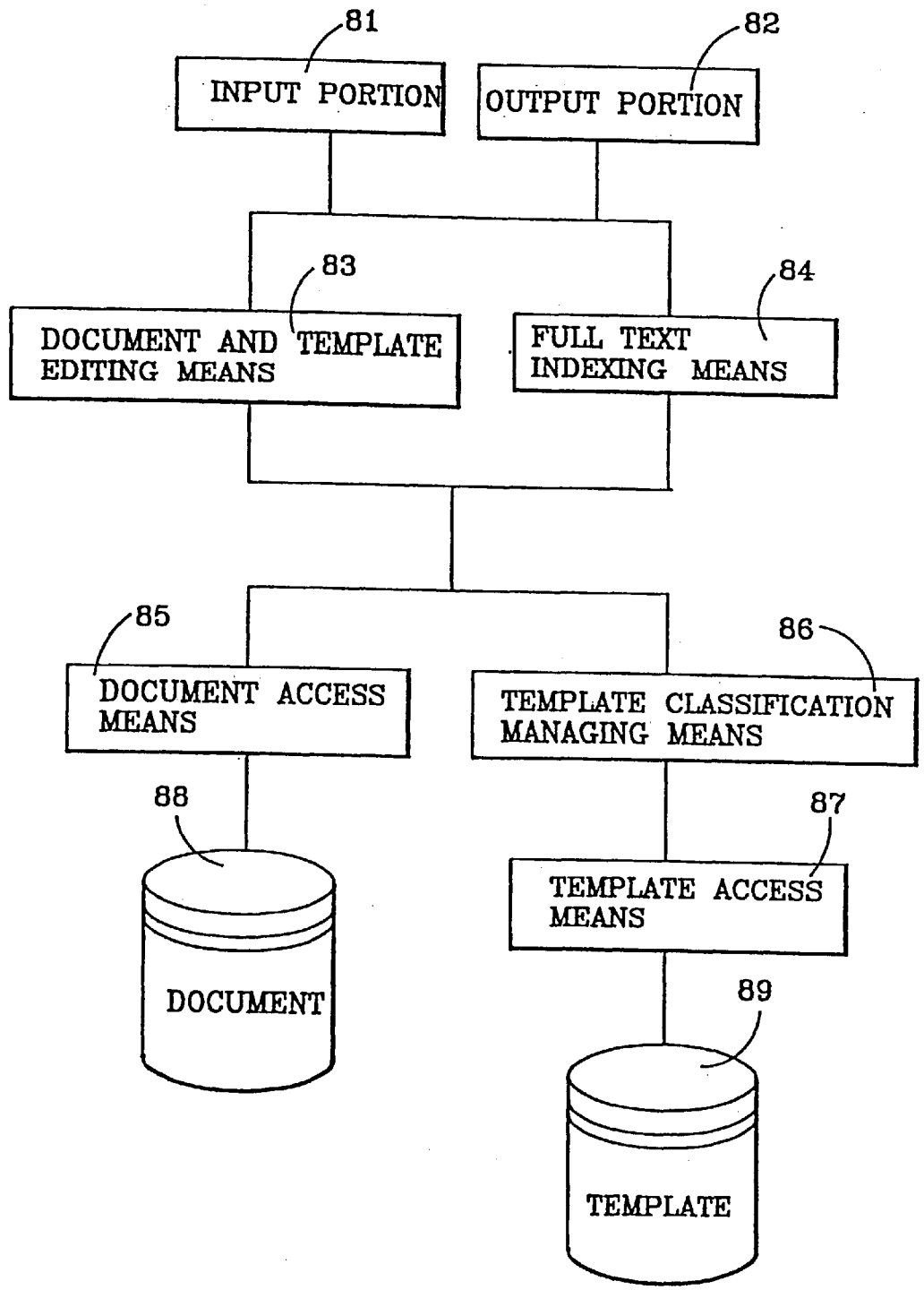
FIG. 8 is a system block diagram of an embodiment of a word processing apparatus in the prior art.
Figure 9:
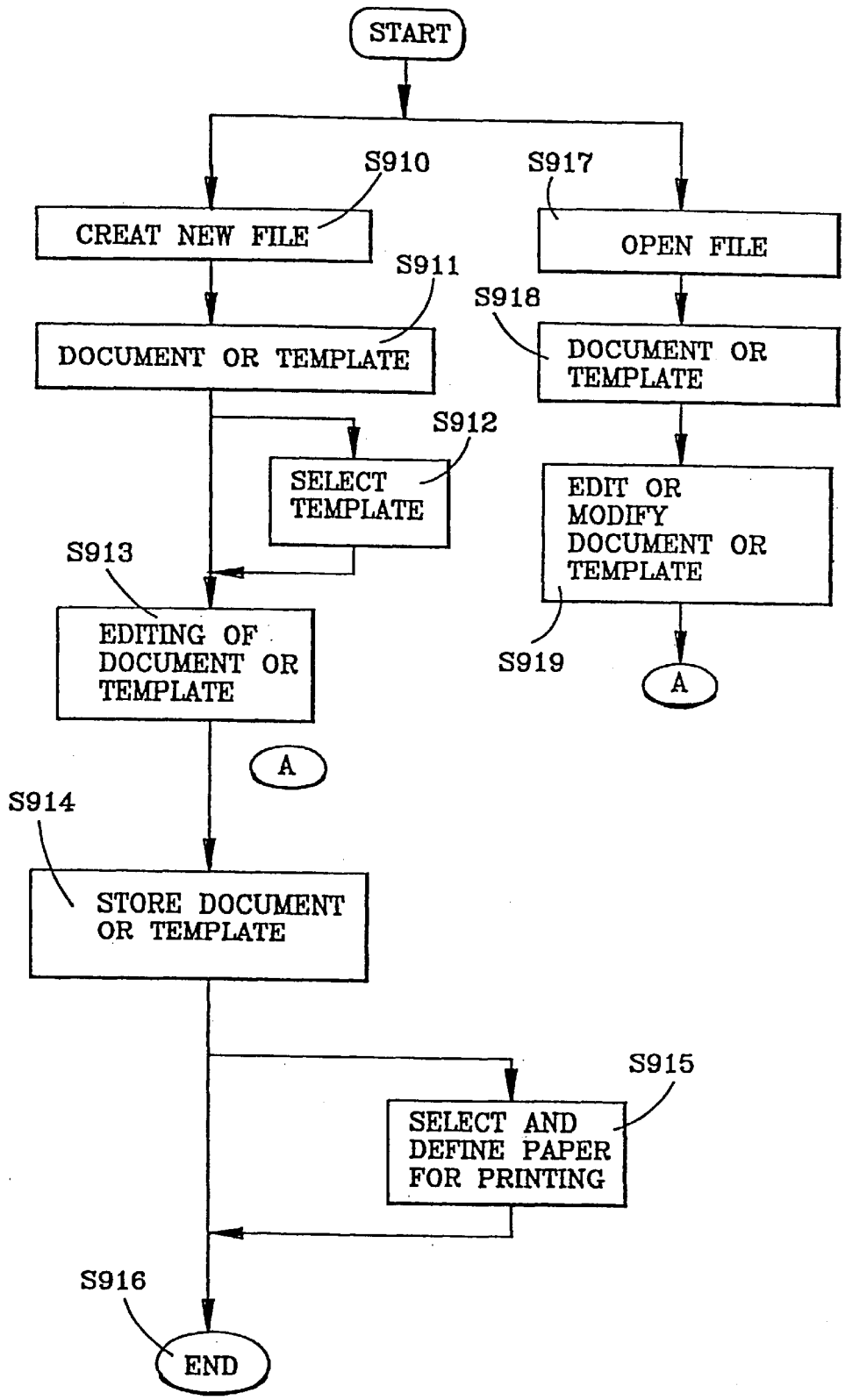
FIG. 9 is a flowchart which illustrates the document editing operation of the embodiment of the word processing apparatus in the prior art.

FIG. 7 is a flowchart which supplements the item data and search condition comparing operation in step S308 of FIG. 3. As shown, the type of the item is determined in step S701. The flow then proceeds to step S702 if the item is in text type, to step S703 if the item is in number type, to step S704 if the item is in date type, and to step S705 if the item is in time type. From step S703, the flow proceeds to step S706, where the number data in text style is converted into a floating decimal. From step S704, the flow proceeds to step S707, where the date data in text style is converted into the total number of days starting from January 1 of the first year of the western calendar. From step S705, the flow proceeds to step S708, where the time data in text style is converted into the total number of seconds from 0:0:0. In step S709, the search data of different item types from steps S702, step S706, step S707 and step S708 undergo arrangement into actual data, and in step S710, the actual data of the items in the document are obtained using Equation A. In step S711, a comparison with the item data is performed. If a match is not found, the flow proceeds to step S712 where a failure value is sent back. Otherwise, in step S713, a success value is sent back.

The advantages of the present invention are as follows:
1. The present invention provides the user with a tool for document editing management for use in editing, browsing and searching documents of the same type.
2. The present invention provides an item list menu and a layout list menu for reference and reuse by the user for similar formats.
3. For items with different types, by using a comparison of data written in different formats and a Boolean condition search, the present invention permits separate storage according to the content of the data and its input format.
4. For data with bridging relationships, the present system provides bridging relationship data management means as a reference aid to the user and for storing bridging relationship data in order to reduce the time for inputting repeating data and achieve uniformity of the data.

While the present invention has been described with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

What is claimed is:

1. A fixed format word processing method for a computer system with a data buffer region, an input portion and an output portion, comprising:

partitioning the data buffer region into a document base for storing different types of document folders, each of which has word processing document data of the same format, into a layout base for storing word processing document formats, and into an item list menu for storing document items;

providing a command input to select execution of template creation or search processing;
if template creation was selected for execution, performing at least one of a number of sub-steps including:
  selecting one of a number of word processing layouts which already include a plurality of the document items from the layout base for conducting modifications;
  selecting a pre-defined one of a number of item lists from the item list menu for redesigning of one of the word processing layouts; and
  defining new document items and designing a new word processing layout which includes the document items, the new document items and the new word processing layout being stored separately in the item list menu and the layout base;
if search processing was selected for execution: specifying a search condition through the input portion; determining if the search condition is to be used to search the document base entirely or a specified one of the document folders; if only the specified one of the document folders is to be searched, retrieving selectively the specified one of the document folders from the document base to the data buffer region for comparison; if the document base is to be searched entirely, comparing the search condition with contents of the document base and retrieving selectively all word processing documents in the document base which meet the search condition; and
combining corresponding ones of the word processing document data, word processing layout and item list in one of the document folders of the document base to form a specified complete word processing document, and outputting the complete word processing document via the output portion.

2. A fixed format word processing method for a computer system with a data buffer region, an input portion and an output portion, comprising:
  partitioning the data buffer region into a document base for storing different types of document folders, each of which has word processing document data of the same format, into a bridging relationship database for storing bridging relationship item data of word processing documents, a layout base for storing word processing document formats, and into an item list menu for storing document items;
  providing a first command input to select execution of document editing management, template creation or search processing;
  if document editing management was selected for execution, providing a second command input to perform at least one of document editing and document management for a specified one of the document folders in the document base to obtain processed data, the document editing including at least one of data copying, cutting, pasting, saving and item data inputting, the document management including at least one of modifying, deleting, saving and printing of the word processing documents; resolving the processed data according to the different item types; storing resolved processed data in the document base; and establishing management of the bridging relationship data items in the item list menu so as to permit searching in the bridging relationship database of the bridging relationship data corresponding to an input main key value during editing of one of the word processing documents in order to generate the bridging relationship data in the word processing document, and so as to record mutual bridging relationship data in the bridging relationship database;
  if template creation was selected for execution, performing at least one of a number of sub-steps including: selecting one of a number of word processing layouts which already include a plurality of the document items from the layout base for conducting modifications; selecting a pre-defined one of a number of item lists from the item list menu for redesigning of one of the word processing layouts; and defining new document items and designing a new word processing layout which includes the document items, the new document items and the new word processing layout being stored separately in the item list menu and the layout base;
  if search processing was selected for execution: specifying a search condition through the input portion; determining if the search condition is to be used to search the document base entirely or a specified one of the document folders; if only the specified one of the document folders is to be searched, retrieving selectively the specified one of the document folders from the document base to the data buffer region for comparison; if the document base is to be searched entirely, comparing the search condition with contents of the document base and retrieving selectively all word processing documents in the document base which meet the search condition; and
  combining corresponding ones of the word processing document data, word processing layout and item list in one of the document folders of the document base to form a specified complete word processing document, and outputting the complete word processing document via the output portion.

3. A fixed format word processing apparatus including a data buffer region, an input portion and an output portion, wherein the improvement comprises:
  said data buffer region being partitioned into a document base for storing data of different document folders, a layout base for storing layouts, and an item list menu for storing item lists;
  a controller, connected to said input and output portions, for selecting between template creation and search processing based on a command input received from said input portion;
  a template editing manager, connected to said controller and said data buffer region, for performing at least one of selecting from among the item lists that include a plurality of document items and the word processing layouts which already exist from said item list menu and said layout base for conducting modifications, and defining new document items and designing a new word processing layout which includes the document items, the new document items and the new word processing layout being stored separately in said item list menu and said layout base;
  a data searching system, connected to said controller and said data buffer region, for receiving from said controller a search condition that was specified via said input portion, for comparing the search condition with at least a specified one of the document folders selected from said document base, and for retrieving all word processing documents in said at least a specified one of the document folders selected from said document base which meet the search condition; and said controller combining corresponding ones of the word processing document data, word processing layout and item list in one of the document folders of said document base to form a specified complete word processing document, and for outputting the complete word processing document via said output portion.

4. A fixed format word processing apparatus including a data buffer region, an input portion and an output portion, wherein the improvement comprises:

said data buffer region being partitioned into a document base for storing data of different document folders, a bridging relationship database for storing bridging relationship item data, a layout base for storing word processing layouts, and an item list menu for storing item lists;

a controller, connected to said input and output portions, for selecting from among document editing management, template creation and search processing based on a command input received from said input portion;

a document editing manager, connected to said controller and said data buffer region, for performing at least one of editing and managing of an existing one of the word processing documents or a new word processing document for a specified one of the document folders of said document base to obtain processed data, the document editing including at least one of data copying, cutting, pasting, saving and character inputting, the document managing including at least one of modifying, deleting, saving and printing of the word processing documents, said document editing manager resolving the processed data according to the different item types of the word processing document data and storing resolved processed data in said document base;

a bridging relationship manager, connected to said document editing manager and said data buffer region, for establishing bridging relationship data item management in said item list menu so as to permit searching in said bridging relationship database of the bridging relationship data corresponding to an input item data in order to generate the bridging relationship data in the word processing document, and so as to record mutual bridging relationship data in said bridging relationship database;

a template editing manager, connected to said controller and said data buffer region, for selecting from among the item lists that include a plurality of document items and the word processing layouts which already exist from said item list menu and said layout base for conducting modifications, and for defining new document items and designing a new word processing layout which includes the document items, said template editing manager storing separately the new document items and the new word processing layout in said item list menu and said layout base;

a data searching system, connected to said controller and said data buffer region, for receiving from said controller a search condition that was specified via said input portion, for comparing the search condition with at least a specified one of the document folders selected from said document base, and for retrieving all of the word processing documents in said at least a specified one of the document folders of said document base which meet the search condition; and said controller combining corresponding ones of the word processing document data, word processing layout and item list in one of the document folders of said document base to form a specified complete word processing document, and for outputting the complete word processing document via said output portion.

\* \* \* \* \*